June 19, 1923.

C. C. BENNETT 1,459,176

DISTANCE FARE OR WAGE CHART

Filed Oct. 6, 1921

Fig. 1.

| | Anaheim | Bakersfield | Beaumont | Bishop | Brawley | ' ' | ' ' | ' ' | ' ' | ' ' | ' ' | Venice | Victorville | Whittier |
|---|---|---|---|---|---|---|---|---|---|---|---|---|---|---|
| Anaheim | 0 | 151 | 65 | 301 | 210 | == | == | == | == | == | == | 41 | 92 | 17 |
| Bakersfield | 151 | 0 | 241 | 152 | 338 | == | == | == | == | == | == | 136 | 148 | 139 |
| Beaumont | 65 | 241 | 0 | 321 | 130 | == | == | == | == | == | == | 198 | 63 | 57 |
| Bishop | 301 | 152 | 321 | 0 | 449 | == | == | == | == | == | == | 291 | 253 | 298 |
| Brawley | 210 | 338 | 130 | 449 | 0 | == | == | == | == | == | == | 228 | 193 | 187 |
| ---- | -- | -- | -- | -- | -- | -- | -- | -- | -- | -- | -- | -- | -- | -- |
| ---- | -- | -- | -- | -- | -- | -- | -- | -- | -- | -- | -- | -- | -- | -- |
| ---- | -- | -- | -- | -- | -- | -- | -- | -- | -- | -- | -- | -- | -- | -- |
| ---- | -- | -- | -- | -- | -- | -- | -- | -- | -- | -- | -- | -- | -- | -- |
| Venice | 41 | 136 | 198 | 291 | 228 | == | == | == | == | == | == | 0 | 118 | 27 |
| Victorville | 92 | 148 | 63 | 253 | 193 | == | == | == | == | == | == | 118 | 0 | 86 |
| Whittier | 17 | 139 | 57 | 298 | 187 | == | == | == | == | == | == | 27 | 86 | 0 |

Fig. 2.

Fig. 3.

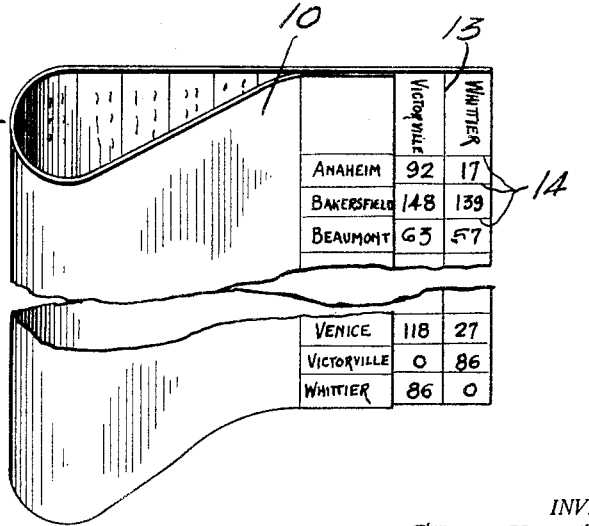

INVENTOR.

*Charles C. Bennett*

BY

*Hazard & Miller*

ATTORNEYS

Patented June 19, 1923.

1,459,176

UNITED STATES PATENT OFFICE.

CHARLES C. BENNETT, OF LOS ANGELES, CALIFORNIA.

DISTANCE FARE OR WAGE CHART.

Application filed October 6, 1921. Serial No. 505,717.

*To all whom it may concern:*

Be it known that I, CHARLES C. BENNETT, a citizen of the United States, residing at Los Angeles, in the county of Los Angeles and State of California, have invented new and useful Improvements in Distance Fare or Wage Charts, of which the following is a specification.

My invention relates to a distance fare and wage chart, the principal objects of my invention being to provide a relatively simple and practical chart that bears data arranged so that when the chart is properly manipulated, the distance between two geographical points or cities, the fare or tariff between two stations of a railroad or other common carrier, or the wages of a workman may be readily ascertained.

A further object of my invention is to provide a distance fare or wage chart that may be easily and cheaply produced, and which may be readily manipulated in making various calculations relating to distances, fares, wages, interest, or any like resultant.

With the foregoing and other objects in view my invention consists in certain novel features of construction and arrangement of parts that will be hereinafter more fully described and claimed and illustrated in the accompanying drawings, in which:

Fig. 1 is a view looking against the face of a chart of my improved construction, parts thereof being broken away.

Fig. 2 is an edge view of the chart.

Fig. 3 is a perspective view and showing the position of the chart when the same is manipulated to ascertain a result such as the distance or fare between two points, or the amount of wages due a workman for a certain number of days' or hours' labor.

Referring by numerals to the accompanying drawings which illustrate a practical embodiment of my invention, 10 designates a sheet of thin flexible material, preferably paper, or light weight cardboard, that will bend readily, said sheet being substantially square or rectangular in outline, and a portion of said sheet, preferably adjacent to the left hand edge thereof, is folded upwardly and inwardly so as to provide a relatively narrow strip or section of material 11 that normally occupies a position directly over the left hand portion of the body of the sheet 10.

Where the chart is outlined for showing distances between cities and towns, the names of said cities and towns are printed in a vertically disposed row on the upper surface of the folded over section 11, and these names are preferably arranged in alphabetical order.

In order to insure accuracy in the use of the chart, I prefer to print between the names of the cities and towns appearing on the face of section 11, horizontally disposed lines 12 that are arranged at equal distances apart.

Appearing on the upper portion of sheet 10, immediately adjacent to its upper edge, and extending from the right hand edge of the folded over section 11 to the right hand edge of said sheet 10, is a second list of the names of cities and towns, and which second list is identical with the list appearing on the folded over section 11.

This second printed list of cities and towns, is arranged in alphabetical order, with the names of the first city or town, or the one corresponding to the first name on the list printed on the folded over section 11, arranged immediately adjacent to the right hand edge of the upper portion of said folded over section, and this second list continuing in alphabetical order to the right hand edge of the sheet 10.

The names in this section list, or the list that is printed across the top of the sheet 10, are separated by vertically disposed lines 13 that are preferably arranged at equal distances apart, and which extend to the lower edge of the sheet 10.

Appearing on the face of the sheet 10, below the printed list of cities on the upper edge thereof, are horizontally disposed lines 14 that are preferably spaced at equal distances apart. Thus the entire face of the sheet 10, below the list of names printed across the upper edge thereof and to the right of the folded over section 11, is divided into relatively small rectangular spaces that form horizontally disposed rows to the right of the folded over section 11, and vertically disposed rows below the list of names printed across the top of the sheet.

Printed in these small rectangular spaces, are numbers that indicate the distance in miles between the points or cities printed on the two lists, the arrangement of these numbers being as follows:

Appearing in the first space directly opposite the names at the head of the list on the folded over section 11 is a zero, or this space may be left blank, for said space is directly below the first name on the printed list at the top of sheet 10, and which name is the same as the first name on the list printed on folded over section 11.

Appearing in the next lower space and directly opposite the second name on the list printed on the folded over section 11 is a number that indicates the distance in miles between the second point or city appearing on the list on said folded over section 11, and the first point or city appearing on said list and upon the list at the top of sheet 10. The same number that appears in the space to the right of the name of the second city on the list printed on the folded over section 11, appears in the space at the top of the second vertical column on sheet 10, or the first space below the second name in the printed list at the top of said sheet.

Thus all of the rectangular spaces on the sheet 10 are printed with numbers representing the distance in miles between the points or cities appearing on the two lists, said numbers being arranged in the vertical and horizontal columns so that when the folded over section 11 is moved across the face of the sheet toward the right hand edge, the exact distance between any two cities appearing on the lists may be readily ascertained.

In order to provide a guide for the manipulation of the folded over section 11 upon the sheet 10 in ascertaining the distance between two cities, a relatively heavy line such as 15 is printed on the upper face of the folded over section 11, and upon the face of the sheet 10, and which line is arranged preferably half way between the printed list at the top of sheet 10 and the lower edge of said sheet.

In the manipulation of my improved chart, the folded over section 11 is engaged and moved toward the right hand across the face of sheet 10 until the right hand edge of said folded over section coincides with the vertical line 13 immediately to the left of the name of one of the cities or points entering into the calculation, and by noting the number in the space at the intersection of the horizontal and vertical columns that contain the names of the two cities or points under consideration, the distance between said points or cities will be ascertained.

Fig. 3 shows the position of the chart while the distance between two points or cities is being ascertained. By printing fare indicating figures in the spaces forming the horizontal and vertical columns on the sheet 10, the total amount of fare to be collected from the passenger between any two points printed on the lists may be readily ascertained.

Likewise by using one list of figures representing different amounts of wages per hour, and another list representing elapsed periods of time, for instance, hours, days and weeks, the total amount of wages to be paid workmen who receive different amounts per hour for working time may be readily ascertained.

A chart of my improved construction is comparatively simple, may be readily and cheaply produced, and is very effective in performing its intended functions.

It will be understood that minor changes in the size, form and construction of the various parts of my improved distance fare or wage chart, may be made and substituted for those herein shown and described without departing from the spirit of my invention, the scope of which is set forth in the appended claims.

I claim as my invention:

1. A distance chart comprising a sheet of thin flexible material having a portion adjacent to one edge folded over on the face of the sheet, the face of the folded-over portion of the sheet bearing a vertically disposed column composed of the names of stations, the upper portion of the face of the sheet to the right of the folded-over portion bearing a horizontally disposed column composed of the names of stations, the arrangement of the names in the two columns being identical, the face of the sheet below the horizontally disposed column and to the right of the folded-over portion bearing the vertically disposed column being printed with distance indicating numerals arranged in vertical and horizontal columns, and the arrangement of the numerals in the respective vertical and horizontal columns being identical.

2. A calculating chart comprising a sheet of thin flexible material, having a portion adjacent to one edge folded over on to the face of said sheet, the face of said folded over portion bearing a vertical row of printed data, the upper portion of the face of the body of the sheet bearing a row of printed data that is identical with the data on the face of the folded over portion, and said last mentioned row of printed data beginning to the right of the right hand edge of the folded-over portion of the sheet and being readable from right to left and the face of the body of the sheet below the data printed at the top thereof being printed with rows of figures that bear direct relation to the data printed at the top of the sheet, and on the face of said folded over portion.

3. A chart comprising a sheet of thin flexible material, having a portion adjacent to one edge folded over on to the adjacent face of said sheet, the face of said folded over portion and the upper portion of the body of the sheet being printed with identical data, the individual items of the printed data on the folded-over portion of the sheet being readable in sequence from top to bottom, and the individual items of the data printed on the upper portion of the body of the sheet being readable from left to right and the face of the sheet below the printed data at the top thereof being formed into vertically disposed columns in which are printed figures bearing direct relation to the printed data on the face of the folded over portion and at the top of the body of the sheet.

4. A chart comprising a thin sheet of flexible material having a portion adjacent to one edge folded over on to the face of the body of said sheet, the face of said folded over portion and the upper portion of the face of the body of the sheet bearing corresponding lists of data, the individual items on the list printed on the folded-over portion of the sheet being readable from top to bottom, and the items of the list printed on the upper portion of the body of the sheet being readable from left to right, the face of the sheet below the list at the top thereof being formed into horizontally disposed columns that are in alignment with the columns of the list printed on the folded over portion, and said columns having printed therein numbers that bear direct relation to the names or data appearing on both lists.

5. A chart comprising a section of thin flexible material, having a portion of one of its edges folded over on to the face of its body portion, the face of said folded over portion, and the upper portion of the body of said sheet being provided with corresponding data, the individual items of the data on the folded-over portion of the sheet being readable from top to bottom and the items appearing across the upper portion of the body of the sheet being readable from left to right and the face of the sheet between said folded over section and the printed portion adjacent to the upper edge thereof, having printed thereupon numbers that bear direct relation to the printed data at the top of the sheet and on the folded over portion thereof, and a relatively heavy guide line appearing on the face of the body of the sheet and on the face of said folded over portion.

In testimony whereof I have signed my name to this specification.

CHARLES C. BENNETT.